United States Patent [19]

Chesarek

[11] 4,386,266
[45] May 31, 1983

[54] METHOD FOR OPERATING A TRANSACTION EXECUTION SYSTEM HAVING IMPROVED VERIFICATION OF PERSONAL IDENTIFICATION

[75] Inventor: Donald J. Chesarek, Los Gatos, Calif.

[73] Assignee: International Business Machines Corporation, Armonk, N.Y.

[21] Appl. No.: 120,222

[22] Filed: Feb. 11, 1980

[51] Int. Cl.³ .............................................. G06K 5/00
[52] U.S. Cl. .................................... 235/380; 375/2.1; 340/825.3
[58] Field of Search ..................... 340/149 A, 152 R; 235/380, 420; 375/2

[56] References Cited

U.S. PATENT DOCUMENTS

| | | | |
|---|---|---|---|
| 3,938,090 | 2/1976 | Borison et al. | 340/149 A |
| 3,956,615 | 5/1976 | Anderson | 340/149 A |
| 4,016,405 | 4/1977 | McCune et al. | 235/61.7 B |
| 4,023,013 | 5/1977 | Kinker | 235/61.7 B |
| 4,075,460 | 2/1978 | Gorgens | 235/420 |
| 4,186,871 | 2/1980 | Anderson et al. | 340/149 A |
| 4,223,403 | 9/1980 | Konheim et al. | 340/152 R |
| 4,234,932 | 11/1980 | Gorgens | 364/408 |

Primary Examiner—Donald J. Yusko
Attorney, Agent, or Firm—Shelley M. Beckstrand

[57] ABSTRACT

A transaction execution system including at least one transaction terminal in communication with a host data processing system. A transaction at the terminal is authorized based, at least in part, upon correspondence of personal identification data entered by the terminal operator at a keyboard with account identification data read from an account card. When the personal identification data is not derived from the account identification data, the correspondence check is made at the host data processing system by comparison of encrypted identification data with validation data. The host may, upon failure of correspondence, communicate a conditional authorization message to the terminal, which enables the terminal operator to again attempt to enter the correct personal identification data. The host data base stores as validation data encrypted identification data, and only double encrypted identification data appears on the communication lines.

10 Claims, 11 Drawing Figures

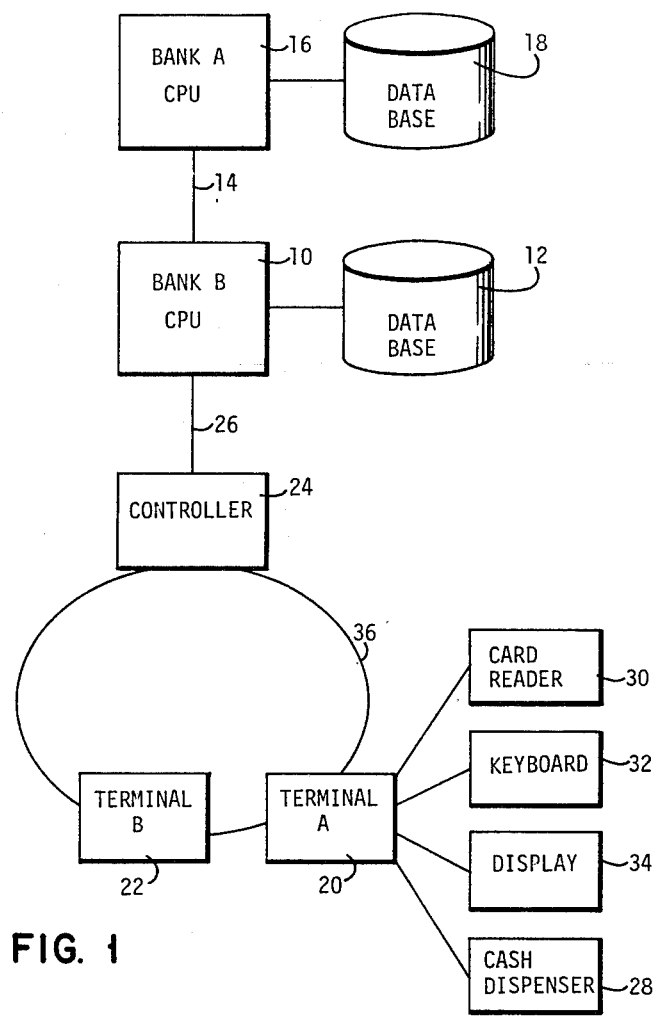
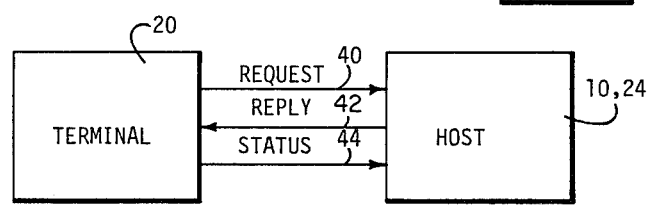
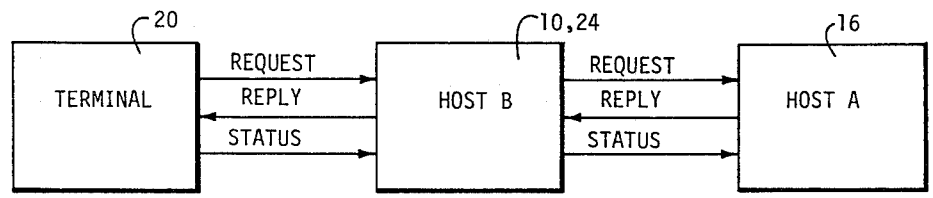

FORMAT USED WHEN TRANS IS REJECTED OR WHEN ENCIPHERED COMPARE DATA IS EQUAL.

FORMAT USED WHEN TRANSACTION IS CONDITIONALLY AUTHORIZED BUT REQUIRES VALIDATION OF PIN BY TERMINAL FOR AUTHORIZATION COMPLETION.

TRANSACTION REPLY MESSAGE FORMAT

METHOD FOR OPERATING A TRANSACTION EXECUTION SYSTEM HAVING IMPROVED VERIFICATION OF PERSONAL IDENTIFICATION

CROSS-REFERENCE TO RELATED APPLICATIONS

This application is an improvement of the following U.S. patents and patent application, the teachings of which are incorporated herein by reference:

1. U.S. Pat. No. 3,956,615 for Transaction Execution System With Secure Data Storage and Communications, by Thomas G. Anderson, William Boothroyd, and Richard C. Frey;

2. U.S. Pat. No. 4,186,871 for Transaction Execution System With Secure Encryption Key Storage, and Communications, by Robert W. Anderson, Steven F. Brock, and May L. Gee; and 3. U.S. Patent Application Ser. No. 009,384, filed Feb. 2, 1979, for Transaction Execution System Having Keyboard and Message Customization, Improved Key Function Versatility and Message Segmentation, by Robert W. Anderson, May L. Gee, and Alice K. McMullen.

TECHNICAL FIELD

This invention relates to transaction execution systems, and more particularly to a method for operating such systems having a central data base at a host data processing system in communication with remote terminals to permit the execution of transactions, such as the issuance of cash or the interaccount transfer of funds in response to entry of a personal identification number, together with a machine-readable identification card issued by any of one or a plurality of cooperating institutions, and where the personal identification number may or may not be derived from data on the identification card.

BACKGROUND ART

Transaction execution systems which enable the performance of transactions, such as cash issuance at terminals remote from and in communication with a host data processing system having a central data base in which account and other information is stored, are well known. Examples of such systems are provided by or referred to in U.S. Pat. No. 3,956,615 of Anderson, et al, U.S. Pat. No. 3,970,992 of Boothroyd, et al, U.S. Pat. No. 3,937,925 of Boothroyd, U.S. Pat. No. 4,186,871 Anderson, et al, and a copending application of Anderson, et al, Ser. No. 009,384, filed Feb. 2, 1979, entitled Transaction Execution System Having Keyboard and Message Customization, Improved Key Function Versatility and Message Segmentation.

Such systems, which are frequently used by banks to extend their services during times of heavy business or business closure, permit the issuance of cash or the receipt of deposits through a terminal. Such a terminal typically includes a mechanism for receiving and reading information from a credit card, a keyboard, a display and document entry and exit apertures. The terminal may operate in conjunction with a data base or as a stand-alone unit. Increased security for the issuance of cash or the performance of other banking transactions without intervention of a bank employee is attained by issuing a personal ID number with each credit card. A credit card transaction is then enabled only when an ID number corresponding to the account number read from the credit card is entered through the keyboard. This required correspondence prevents a thief or mere finder of a credit card from receiving cash, for example, from a terminal. If a terminal operates in conjunction with a data base, the correspondence between account numbers and ID numbers can be chosen at random, but frequently the ID number is derivable from the account number in accordance with a predetermined code. The former situation will be discussed hereafter. In the latter situation, in order for the ID number to be chosen at random, such as by selection by the customer, an offset value is recorded on the card along with the account number, which offset value is selected such that when added or otherwise combined with the ID number derived from the account number in accordance with the predetermined code, the result is the ID number chosen at random. These predetermined relationships between ID number and account (and offset) data from the card permit a stand-alone terminal to check the ID number by algorithmically relating the ID number to the account number. If credit cards issued by a plurality of cooperating banks are to be usable in a given terminal, all such banks must use the same code or algorithm, or otherwise provide for distinguishing the algorithmic relationship used in issuing ID numbers from account data. In one such system, a key-driven algorithm is provided for determining the relationship between ID numbers and account numbers. In such a system, the account number and key number are combined using linear and nonlinear operations to generate a check number for comparison with the ID number. The Anderson U.S. Pat. No. 3,956,615 is such a system. For cards issued by different banks to be used in the same terminals, however, all banks must use the same key number, and the account number must be located in the same field on all cards. In one improvement on the Anderson system, a table of encrypted keys is maintained in each terminal, containing the keys required for use in the key-driven algorithm for a plurality of cooperating banks, together with data specifying the location on the card data track of account, offset, and other data to be used in generating the check number for comparison with the ID code entered at the keyboard. In an improvement on that system, which is described in the previously referred to U.S. Pat. No. 4,186,871 of Anderson, et al, the host data processing system includes a virtual financial institution table (VFIT). Upon entry by a consumer of a credit card and personal identification number, the financial institution table (FIT) within the terminal is searched in an attempt to locate an entry corresponding to the institution identified by the credit card. If a corresponding entry is located, data from the fields for that entry is used to encrypt the personal data from the credit card for purposes of verification of the personal identification number entered by the consumer. If a corresponding entry is not located in the financial institution table at the terminal, a search of the virtual financial institution table at the host is made. If a corresponding entry is located in the host financial institution table, the included data is communicated back to the terminal where it is used in the verification of the personal identification number.

Alternatively, the FIT entry at the terminal can include a control bit instructing the terminal to communicate the credit card data and the personal identification number to the host for authorization of the transaction, including the check of correspondence between the account numbers and ID numbers (which is sometimes referred to as a PIN check.)

A PIN check to be performed at the host, in addition to a terminal PIN check, is described in the Anderson U.S. Pat. No. 3,956,615. In such a host PIN check, the personal identification number entered at the terminal is double encrypted and sent to the host, along with card data. At the host, the double encrypted identification number is singly decrypted, and a data base of encrypted identification numbers is accessed by the card data. The encrypted identification number obtained from the data base is compared with the singly decrypted/double encrypted personal identification number received from the terminal to thus perform the host PIN check. However, in this system, it is expected that if the host PIN check fails, the transaction will not be approved—the PIN must be entered correctly on the first attempt.

When the PIN check is performed at the terminal, based upon verification of an algorithmic relationship between card data and the ID number entered at the keyboard, failure of correspondence may result in a request to the individual to try again to enter the correct ID number, and a plurality of failures of correspondence permitted before rejecting the transaction.

While the previously mentioned table derived key-driven credit card and ID number identification technique improves the security of cash issue terminals and permits a plurality of banks to cooperate in honoring cards issued by the others, there are still weaknesses that may be exploited to gain access to the large amounts of cash that are stored in the terminal or available in the accounts of cooperating banks for interfund transfer by operation of the terminal. One serious problem relates to the security of the encryption algorithm for terminals which are capable of stand-alone operation, or even on-line operation. A large number of operators or maintenance personnel are required for the day-to-day support of cash issue terminals. For example, one or two people at each branch bank location may have internal access to the cash issue terminals. Oftentimes these people may have access to the encryption key for normal maintenance. Alternatively, with only a little training, these people could learn to acquire the key by fraudulently tapping the communication line or by measuring electrical signals on the internal circuitry. Once an encryption key is acquired, and if the algorithm is known, a correspondence between a large number of account numbers and ID numbers could be generated. Then, with the knowledge of the card format and location of verification and offset data on the card, correspondence between card data and random chosen ID numbers can be ascertained.

Because of this, some institutions in an interchange environment require that the PIN check be done at their own host so that cooperating banks would never have access to the encryption keys relating the card data to the personal identification numbers. As previously noted, however, this generally requires rejection of a transaction when the host PIN check fails. The customer could immediately try to initiate a second transaction, particularly if told that a PIN check failure caused rejection of the first transaction. However, this is time consuming to the customer and the system, resulting in additional terminal/host communications with resulting expense and degradation of total system availability.

SUMMARY OF THE INVENTION

A transaction execution system, in accordance with the invention, includes a host data processing system having a data base of stored information, including validation numbers, which validation numbers may or may not be derived by encryption of account identification or related data. Connected to the host data processing system are one or more terminals, each terminal including means for entering account identification data and personal identification data.

In accordance with the invention, the personal identification data entered at the terminal is encrypted, using a first encryption key, to give a first resultant. The first resultant is concatenated with a terminal-generated variable number, and then the concatenated number encrypted, using a second encryption key to generate a double encrypted personal identification number. The double encrypted personal identification number is then communicated to the host, along with account identification data, where the double encrypted number is decrypted using the second encryption key to yield the first resultant, and the first resultant compared with the validation number associated in the host data base with the account identification data.

If, at the host, the validation data and first resultant do not compare, but the transaction is otherwise approved, the host concatenates the variable number and the validation data, encrypts the concatenated number with the second encryption key to generate encrypted validation data, and communicates the encrypted validation data to the terminal in a conditional transaction approval message.

The terminal decrypts, using the second key, the encrypted validation data from the conditional transaction approval message to generate validation data for comparison with a newly entered personal identification data which has been encrypted with the first key. Alternatively, the generated validation data is decrypted, using the first key, for comparison with the newly entered personal identification number (which has not been encrypted). Based upon the comparison of the newly entered PIN and the data from the conditional transaction approval message, the transaction may be approved by the terminal.

BRIEF DESCRIPTION OF THE DRAWINGS

In the accompanying drawings forming a material part of this disclosure:

FIG. 1 is a functional block diagram representation of a typical transaction execution system having interchange capability.

FIG. 2 is a functional block diagram representation of the basic communication messages within a second typical transaction execution system.

FIG. 3 is a functional block diagram representation of the basic communication messages within the transaction execution system of FIG. 1.

Referring now to FIG. 4, an explanation will be given of the operation of terminal 20 to generate transaction request message 40, for secure and optimal performance of an initial PIN check at the host, such as may be required when the PIN is not derived from data recorded on the ID card, or when the encryption key required to check correspondence between the PIN and card data is not available at the terminal, or even when the PIN check is performed, but fails at the terminal, and a further PIN check at the host is desired. As will become apparent hereinafter, an initial PIN check at the host under any of the above circumstances, which fails, may be followed by a subsequent PIN check at the terminal, based on newly entered PIN data, without the necessity to re-establish communication with the host for the purpose of the PIN check, and with the communications secure against fraudulent tapping to determine the correct PIN associated with the account card.

Figure 4:
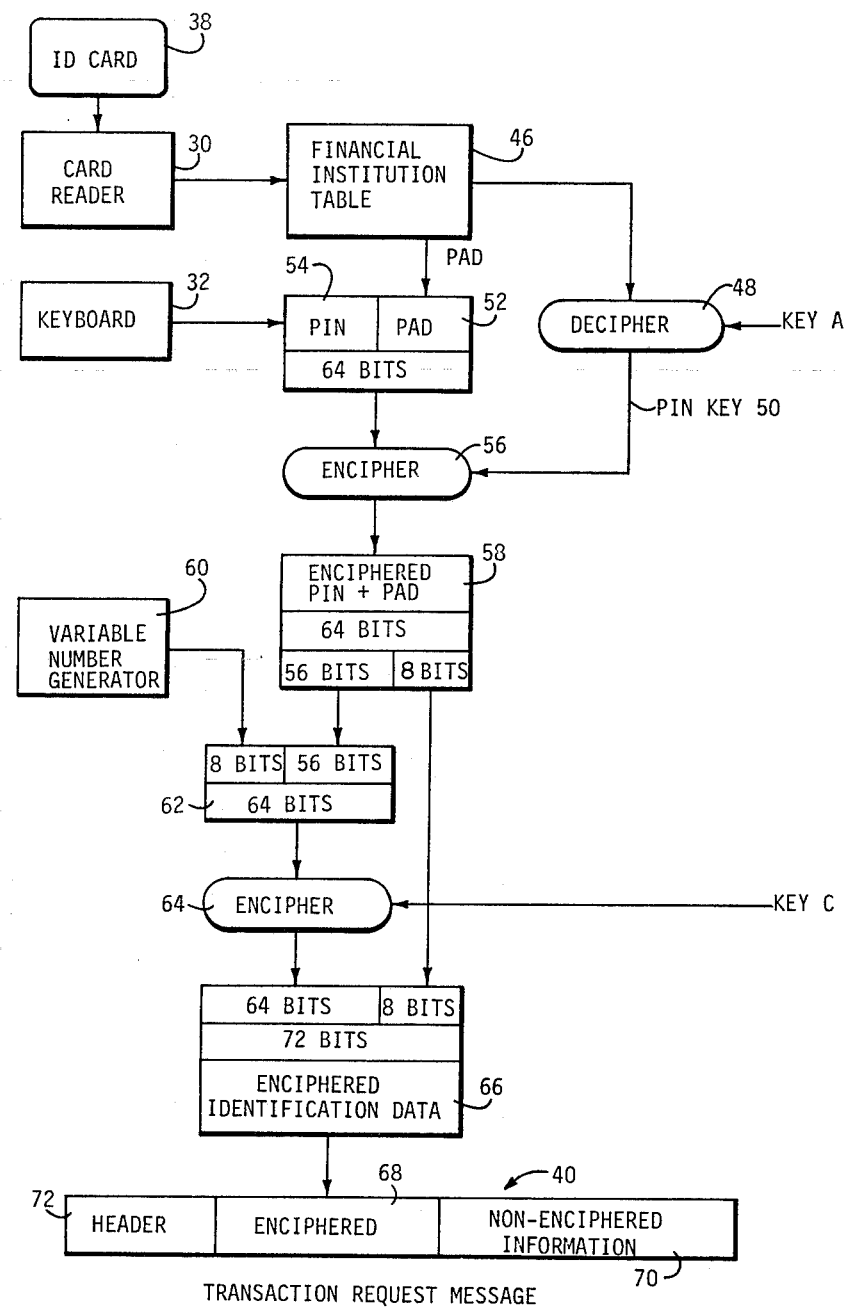
FIG. 4 is an operational block diagram representation of the generation in a terminal of a transaction request message.

Terminal 20 includes a programmable microprocessor which operates under the control of a microprogram, as is more fully described in the Anderson Pat. Nos. 3,956,615 and 4,186,871.

ID Card 38 is read by card reader 30, and issuing institution identification data therefrom used to access Financial Institution Table (FIT) 46. Data in FIT 46 is deciphered under control of Key A to generate PIN KEY 50, which may be institution unique. The decipher step 48 and all other encryption and decryption processes referred to herein may be performed in accordance with the National Bureau of Standards "Encryption Algorithm for Computer Data Protection," Federal Register, Vol. 40, No. 52, Monday, Mar. 17, 1975, pages 12134-12138 (hereinafter referred to as DES— meaning "data encryption standard"). DES may be implemented either as a hardware module or as a microcode routine, as will be apparent to those skilled in the art.

Also obtained from FIT 46 is PAD digit 52 for the institution, which is concatenated with PIN 54 digits entered by the customer at keyboard 32 to generate a 64-bit number for encryption by DES at step 56 under control of PIN KEY 50. Enciphered PIN and PAD 58 is 64 bits, 56 bits of which are concatenated with 8 bits from variable number generated 60, and the thus concatenated number 62 is enciphered at step 64 using DES and under control of communication key, Key C.

Variable number generator 60 may, by way of example, generate a number algorithmically related to some transaction or terminal state, such as transaction sequence number or rollover bill counter. Key C is the communication key and is used to provide security over the communication link between the terminal and host systems.

The output of encipher step 64 is a 64-bit, double encrypted number which is concatenated with the remaining 8 bits of encyphered PIN and PAD 58 to form a 72-bit enciphered identification number 66 for the enciphered field 68 of transaction request message 40. Nonenciphered information 70 includes, for example, the necessary data for host processing of the transaction request, such as data read from card 38 and transaction type, amount, and so forth, entered at keyboard 32 (but not including the PIN). Header 72 identifies the message type and the terminal address.

Figure 5:
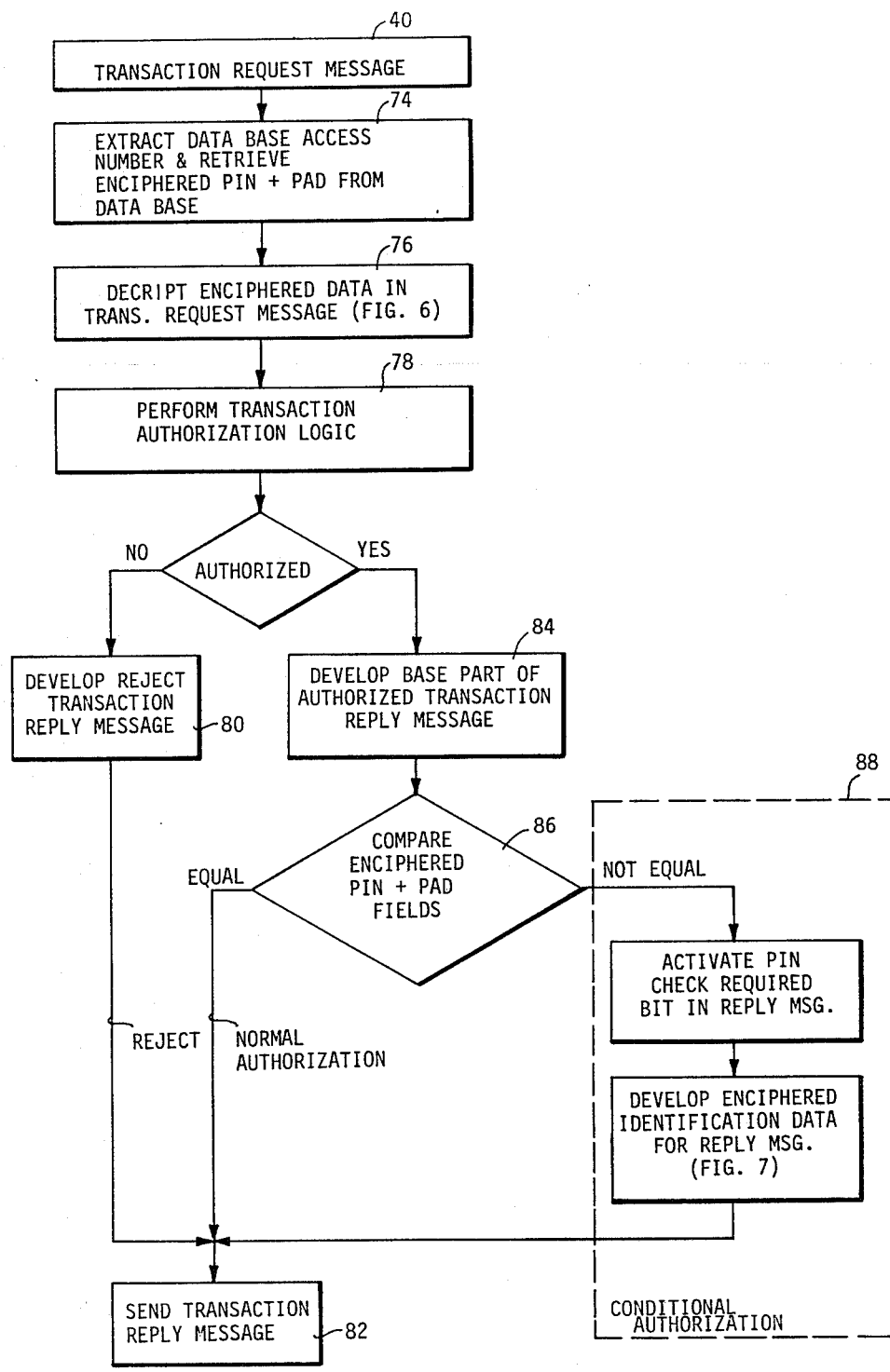
FIG. 5 is an operational flow diagram representation of the generation in a host of a conditional transaction authorization message.

Referring now to FIG. 5, the process to be performed at host bank A or B to check the PIN and generate a transaction reply message 42 is set forth. Referring, by way of example, to bank B, transaction reply message 40 includes in nonenciphered information 70 a data base access number, which may be related to the customer account number read from ID card 38. In step 74, the data base access number is extracted from request message 40, and used to retrieve (as an address or search argument) validation data, which is the customer PIN, concatenated with the PAD, enciphered and stored in data base 12—the enciphered PIN+PAD. In this way, the customer PIN is not stored in the host data base in clear text, where it could be read in the clear by unauthorized individuals.

In step 76, which will be more fully described in connection with FIG. 6, enciphered data 68 from the transaction request message is deciphered. In step 78, the transaction authorization processing occurs, including such checks as account balance, account activity, stolen or lost ID card checks, as determined by the host bank application program. If the transaction is not authorized, based upon the above checks, host 10 prepares in step 80 a transaction reply message 42, rejecting the transaction for communication in step 82, to terminal 20. In the event that the transaction is authorized, at least on the basis of the account checks of step 78, in step 84 the base part of transaction reply message 42 is prepared, as is more fully described in the previously noted Anderson patents and application.

Figure 8:
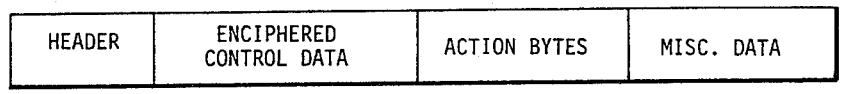
Figure 11:
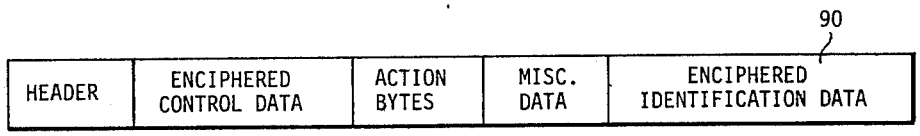

In step 86, the host PIN check is performed, comprising a comparison of the enciphered PIN+PAD field obtained from data base 12 in step 74 with the enciphered PIN+PAD field prepared in step 58 of FIG. 4 and derived from the transaction request message in step 76 of FIG. 5. If the host PIN check is successful, transaction reply message 42 is generated in step 84 and transaction approval is sent to terminal 20 in step 82. If the host PIN check is not successful, a transaction reply message indicating conditional authorization is generated in step 88 for communication to terminal 20 in step 82. The format of a transaction reply message generated in steps 80 or 84 indicating approval or rejection is shown in FIG. 8. A transaction reply message generated in steps 84 and 88 indicating conditional authorization and establishing in the terminal a conditional transaction approval state is shown in FIG. 11.

In step 88, a PIN check required bit in reply message 42 is activated, and the enciphered identification data field 90 generated, as will be described in connection with FIG. 7. A conditional authorization reply message provides the terminal with the data necessary to permit the customer to retry to enter the correct PIN without the necessity to re-establish communication with the host.

Figure 6:
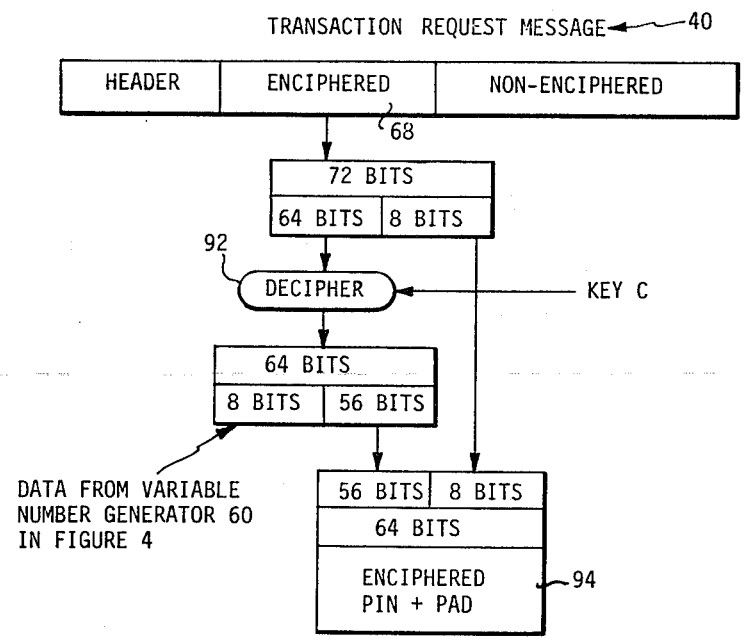
FIG. 6 is an operational block diagram representation of the generation in a host of enciphered PIN and PAD data from a transaction request message.

Referring to FIG. 6, the process to be performed in the host to generate the enciphered PIN+PAD from enciphered field 68 of transaction request message 40 is set forth. In step 92, 64 bits of enciphered field 68 are decrypted, using communication key KEY C. The resulting 64 bits include an 8-bit portion representing the data from variable number generator 60 (FIG. 4), and 56 bits which are concatenated with the remaining 8 bits of field 68 to give enciphered PIN+PAD number 94, which will be equal to data 58 of FIG. 4 and used in host PIN check step 86 (FIG. 5).

Figure 7:
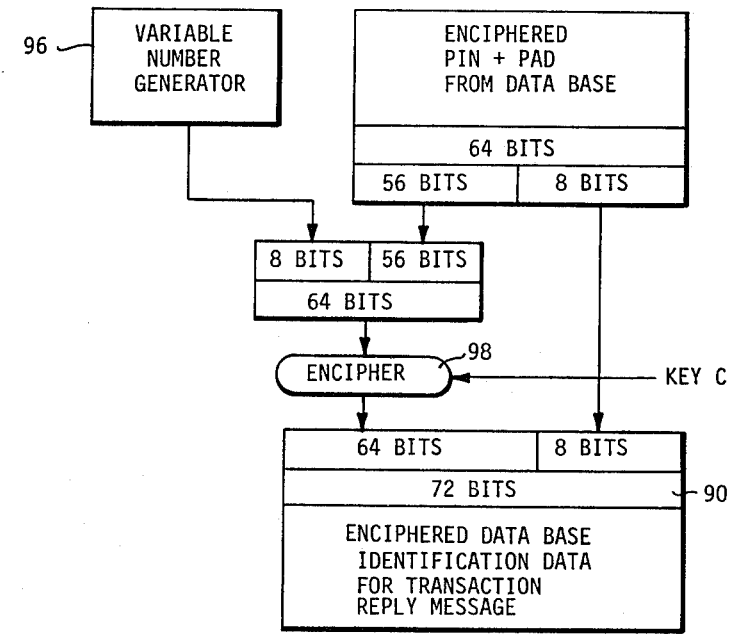

Referring to FIG. 7, the process to be performed by host CPU 10 in step 88 (FIG. 5) to generate the enciphered data base identification data 90 for a transaction reply message 42, indicating conditional approval, is set forth. By this approach, the PIN validation data element (which is, in this example, the enciphered PIN+-

FIG. 7 is an operational diagram representation of the generation in a host of enciphered identification data from the host data base for a conditional transaction authorization message.

FIGS. 8 and 11 are format diagram illustrations of transaction reply messages, including a transaction authorization message and a conditional transaction authorization message.

Figure 9:
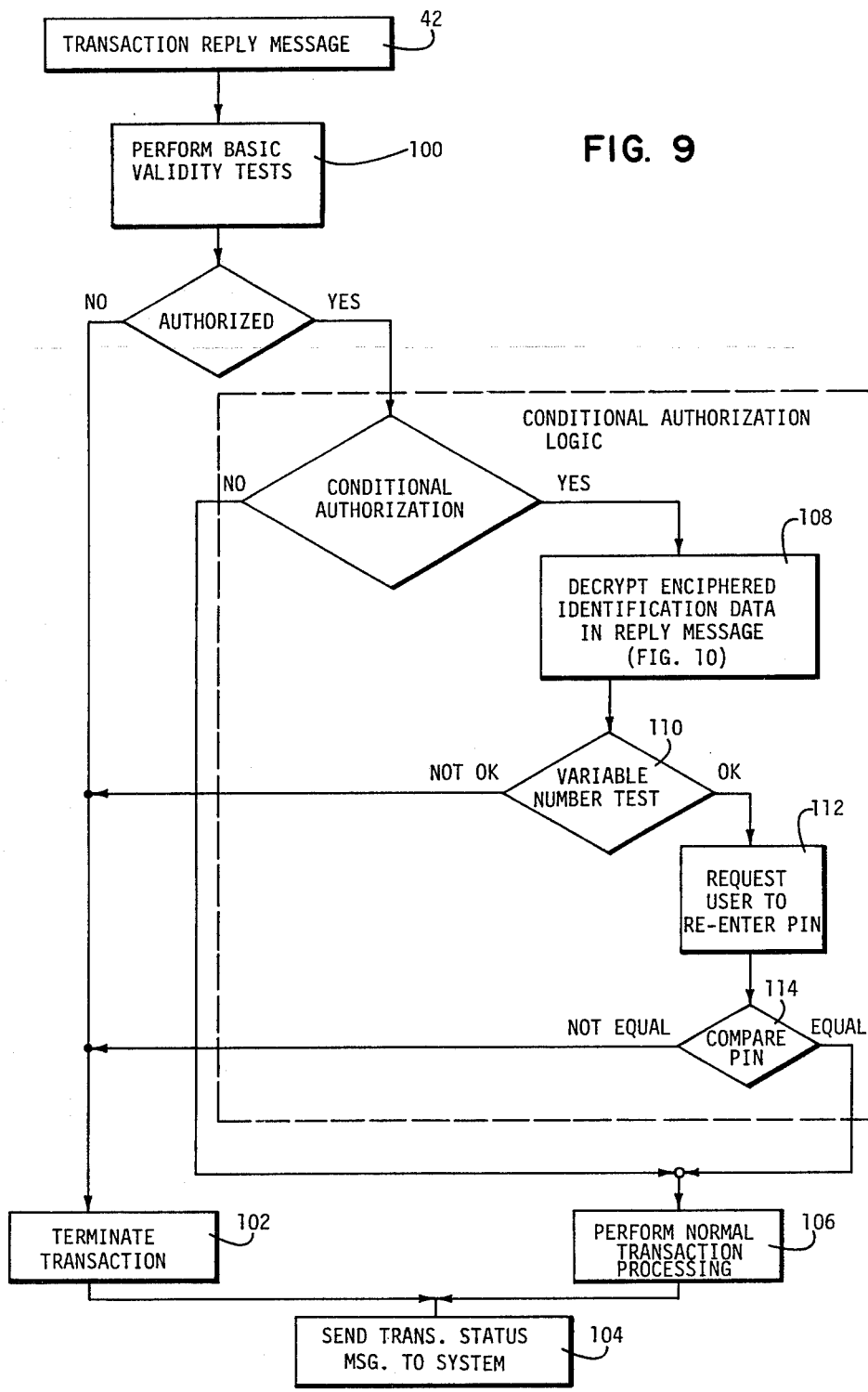

FIG. 9 is an operational flow diagram representation of generation in a terminal of a status message to the host in response to a transaction reply message.

Figure 10:
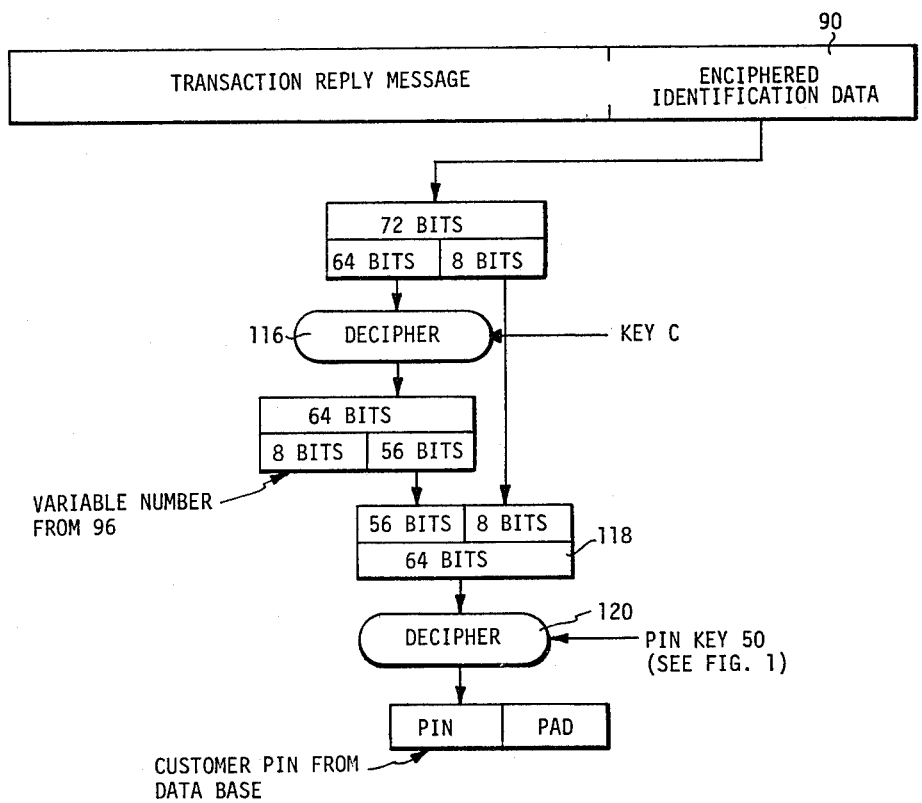

FIG. 10 is an operational block diagram representation of generation in a terminal of validation data from enciphered data received in a transaction reply message.

DISCLOSURE OF INVENTION

For further comprehension of the invention, and of the objects and advantages thereof, reference will be had to the following description, accompanying drawings, related applications, and to the appended claims in which the various novel features of the invention are more particularly set forth.

Referring to FIG. 1, the invention provides an improved transaction authorization system comprising a host bank CPU 10 having a data base 12. CPU 10 may be, for example, an IBM System 370 having a VTAM application program, which is executed in the System 370 processor under control of DOS/VS, OS/VS1 or OS/VS2, with access to data base 12 through VSAM, ISAM, and/or SAM, as will be apparent to those skilled in the art. The data base 12 includes the application library and customer account files—the latter including such account status information as account balances and activity, and also validation data, to be discussed more fully hereafter.

In an interchange environment, two or more cooperating financial institutions provide interconnection between their respective data processing systems, and such is illustrated by line 14 interconnecting CPU's 10 and 16. CPU 16 is attached to data base 18, which would contain the account data files for its customers.

Bank B CPU 10 is attached to a plurality of banking terminals 20, 22, on communication loop 36. Such attachment may be directly (such as by an SDLC network, not shown) or through controller 24, which may be an IBM 3601 Finance Communication Controller. Link 26 represents a communication link which may be controlled by VTAM in CPU 10, and include an IBM 3704/3705 telecommunication link controller under control of an NCP/3 (Network Control Program, Version 3).

Controller 24 may include a diskette for storage of account data, representing some subset of the data stored in data base 12.

While bank B CPU 10 is shown in communication with terminals 20, 22, bank A CPU 16 may be similarly attached to its own population of banking terminals. In an interchange environment, cooperating banks agree to perform at their respective terminals, banking transactions for individuals identified as customers of other cooperating banks.

In such an interchange environment, an individual possessing a machine-readable identification card issued by bank A may wish to withdraw cash from his account at bank A through cash dispenser 28 at terminal 20, or perform any other financial function, such as deposit, transfer, account inquiry, or bill payment (by deposit or by withdrawal from a specified account).

In order to assure that the individual attempting to operate terminal 20 is entitled to perform a transaction, it is normally required that he insert his machine-readable account card (ID card or credit card) into card reader 30, and enter in at keyboard 32 his personal identification number (PIN). Data read from the account card includes data, which may be all or a portion of an account number on the card, which is used to check the validity of the PIN. This validity check, or PIN check, may be conducted by encrypting either the card data or the PIN, and comparing the result with the other—encrypted card data compared with PIN, or encrypted PIN with card data—with the encryption being performed under control of a key, as is more fully described in Anderson U.S. Pat. No. 3,956,615 and in Anderson U.S. Pat. No. 4,186,871. In the latter, Anderson '871, the provision of a Financial Institution Table (FIT) is explained, which would permit the storage in terminal 20 of the bank A encryption key required for the PIN check to be performed in terminal 20 for cards issued by bank A. However, bank A, even though willing to enter into an interchange agreement with bank B, may choose not to store its encryption keys in the bank A FIT tables (which may reside at CPU 10, controller 24, and/or terminals 20,22). Further, bank A may choose to issue PIN's to its customers which are not derived from data encoded on their account cards. In either event, terminal 20 is unable to check for correspondence between the data read by reader 30 from the accound card and the personal identification number (PIN) entered at keyboard 32. In that situation, the customer is instructed, such as via display 34, to enter the information required to perform the transaction, as is more fully described in the Anderson U.S. Pat. Nos. 3,956,615 and 4,186,871, and copending Anderson application Ser. No. 009,384. That information required to perform the PIN check at the host, including account identification information (which may be read from the card by reader 30 and/or entered at keyboard 32 by the customer), is sent to the host, herein CPU 16, for a host PIN check, as will be more fully described hereinafter. Also, bank B may require that its terminals 20,22 communicate the data received from bank B customers to controller 24 or CPU 10 for a host PIN check, such as when bank B issues PIN's to its customers which are not derived from data which is recorded on their account cards.

Referring to FIG. 2, by way of example, communication between terminal 20 and the host (controller 24 or CPU 10) for a typical transaction, is performed in accordance with a three-message protocol, including a transaction request message 40, transaction reply message 42, and status message 44 (as more fully described in Anderson U.S. Pat. No. 4,186,871 in connection with FIG. 5, and in Anderson application Ser. No. 009,384 in connection with FIG. 12, which also describe the VFIT and interactive related messages which may be used in processing a transaction).

Referring to FIG. 3, further by way of example, communication from terminal 20 of bank B is shown forwarded by bank B to host 16 of bank A through the same message protocol, which may also include the above-mentioned VFIT and interactive messages. Transaction processing may be distributed by the application programs between host elements 24, 10 and 16 in order to optimize communication time, storage costs, security requirements, and terminal usage.

PAD stored in data base 12) does not appear on communication lines 26, 36, where it could be tapped and later used to control operation of a terminal 20 to fraudulently issue cash.

Variable number generator 96 may provide one of the following. First, it may merely provide that number generated by variable number generator 60, and which is available as the 8-bit field at the output of decipher step 92 (FIG. 6). Second, it may generate a random number. Third, it may generate a number algorithmically related to some quantity in the transaction request message (such as the transaction sequence number).

The 8-bit output of variable number generator 96 is concatenated with 56 of the 64 bits of the enciphered PIN+PAD obtained from data base 12 and enciphered by DES in step 96, using communication key KEY C. The resulting 64 bits are concatenated with the remaining 8 bits of the enciphered PIN+PAD from data base 12 to give the 72-bit double-enciphered field 90 for the transaction reply message.

Referring now to FIG. 9, the process to be performed at terminal 20 in response to receipt of transaction reply message 42 will be described. In step 100, basic validity tests are performed on data in selected fields of the base part of the reply message. If, as a result of these tests, it is determined that the transaction is not authorized, the transaction is terminated in step 102 and the transaction status message communicated to host 10 in step 104. If the transaction is unconditionally authorized, terminal 20 completes the transaction in step 106, before sending the status message.

If the transaction is conditionally authorized, the customer will be permitted to enter a new PIN (one or more times), which will be checked at terminal 20 for correspondence with the enciphered PIN+KEY stored in data base 12. Optionally, a variable number test may be conducted as an added precaution. In step 108, enciphered identification data 90 is deciphered, following the procedure of FIG. 10, described below. In step 110, the variable number field, generated at the host by variable number generator 96, is checked for comparison with that previously (or again) generated by variable number generator 60 in terminal 20. This check is not performed if variable number generator 96 generates a random number. If the optional variable number test is failed, the transaction is terminated.

In step 112, the customer is instructed to enter his PIN number at keyboard 32. This newly entered PIN would be expected to differ from that originally entered (to enter PIN 54 in FIG. 4), such as would occur when the customer had forgotten his PIN and is being given an opportunity to try again. In step 114, the newly entered PIN is compared with the PIN from host data base 12, and if equal, a transaction approval state is generated, enabling the transaction to be performed in step 106. If not equal, after some predetermined number of permitted trys to enter the correct PIN, the transaction is terminated. In preparation for the comparing step 114, enciphered identification data 90 is twice deciphered, using the procedure of FIG. 10. Alternatively, the newly entered PIN could be enciphered, using the procedure of FIG. 4, step 56, and the identification data 90, once deciphered, using the procedure of step 116, FIG. 10.

Referring now to FIG. 10, the process to be performed in terminal 20, to twice decrypt enciphered identification field 90 in preparation for the test of step 114 (FIG. 9) comparing the newly entered PIN with that PIN which was encrypted to be stored in data base 12, will be described. In step 116, 64 bits of the 72-bit field 90 are deciphered by DES, using communication key KEY C. 56 of the resulting 64 bits are concatenated with the remaining 8 bits of field 90 to give the single deciphered (or enciphered) PIN+PAD 118. The remaining 8 bits of the 64-bit result of decipher step 116 is the variable number generated at host 10 by variable number generator 96, and is used in the check of step 110, FIG. 9. Single encrypted PIN+PAD 118 is the same number that is stored in host data base 12. In step 120, it is again deciphered by DES, this time with PIN KEY 50, to yield in clear text the PIN number to be compared with the newly entered PIN.

BEST MODE FOR CARRYING OUT THE INVENTION

Referring to FIG. 1 in connection with FIG. 2, the operation of the transaction execution system of the invention in accordance with the best mode will be explained.

In terminal 20, transaction request message 40 is generated, including a personal identification number entered at keyboard 32 and encrypted twice, using two keys, together with data base access data input through card reader 30. The request message 40 is transmitted to host CPU 10.

In host CPU 10, the data base access number is extracted from the request message 40, and used to retrieve from data base 12 a validation number associated therewith (and representing a singly encrypted PIN). The twice encrypted personal identification number from the request message 40 is deciphered using the communication key and compared with the singly encrypted PIN retrieved from data base 12. If they are not equal, the singly encrypted PIN from data base 12 is further encrypted in the communication key, and the resulting double encrypted PIN transmitted to terminal 20 in a transaction reply message 42, indicating conditional approval of the transaction.

In terminal 20, the customer is instructed to enter a new PIN at keyboard 32. The double encrypted PIN from transaction reply message 42 is twice decrypted and checked against the newly entered PIN for correspondence. If the PIN's correspond, the transaction is completed.

INDUSTRIAL APPLICABILITY

The described transaction execution system, when operated according to the invention, provides for secure validation of a PIN which is not derived by encryption of card data, and which permits a number of attempts to be made by the customer to successfully enter the PIN without requiring host communications for each attempt. It is of particular value in a bank-interchange environment, with communication of PIN's through cooperating institutions done only in a secure encrypted form.

While the preferred embodiments of the invention have been illustrated and described, it is to be understood that such does not limit the invention to the precise constructions herein disclosed, and the right is reserved to all changes and modifications coming within the scope of the invention as defined in the appended claims.

I claim:

1. A method for operating a transaction terminal to verify the authenticity of a personal identification number, the terminal including means operable by a terminal operator for entering said personal identification number and a data base access number, and communication means for sending data to and receiving data from a host system, the method comprising the steps of:

encrypting a personal identification number entered into said terminal according to first and second enciphering processes to generate a twice encrypted identification number;

preparing a transaction request message, including a data base access number and said twice encrypted identification number;

transmitting said transaction request message onto said communication means;

receiving from said communication means a transaction reply message selectively approving, denying, or conditionally approving the transaction; the transaction reply message including encrypted validation data when the transaction is conditionally approved; and responsive to a transaction reply message conditionally approving the transaction:

decrypting said validation data according to said first and second enciphering processes to generate deciphered validation data;

receiving from said terminal operator a reentered personal identification number; and comparing said deciphered validation data with said reentered personal identification number and, responsive to favorable comparison of said deciphered validation data and said reentered personal identification number, generating a transaction approval signal.

2. A method for operating a transaction terminal to verify the authenticity of a personal identification number, the transaction terminal including means operable by a terminal operator for entering personal identification data, and means for communicating data with respect to a host system, the method comprising the steps of:

encrypting a personal identification number entered into said terminal according to first and second enciphering processes;

transmitting the encrypted identification number to said host system;

receiving from said system a conditional approval message including validation data;

decrypting said validation data in accordance with said second enciphering process;

responsive to receiving a conditional approval message, instructing the terminal operator to reenter the personal identification number;

encrypting the reentered personal identification number according to said first enciphering process; and comparing the decrypted validation data and the encrypted reentered identification number conditionally to generate a transaction approval signal based upon the results of the comparing.

3. A method of operating a transaction terminal in response to a transaction approval message received from a host system; the terminal including enciphering means for operating on data according to first and second enciphering procedures, and means for receiving identification data from a terminal operator, the method comprising the steps of:

determining that a message received from said host system establishes a conditional transaction approval state, said message including validation data;

responsive to a conditional transaction approval state, receiving identification data from said terminal operator; and comparing said validation data and said identification data for correspondence according to said enciphering procedures to generate a transaction approval state;

whereby a transaction may be approved, even though first identification data entered by a terminal operator fails a correspondence comparison with said validation data at the host.

4. The method of claim 3 wherein said comparing step further comprises the step of deciphering said validation data in accordance with said first and second enciphering procedures to generate deciphered validation data for comparison with said identification data.

5. The method of claim 5 wherein said comparing step further comprises the steps of:

deciphering said validation data in accordance with said first enciphering procedure to generate deciphered validation data;

enciphering said identification data in accordance with said second enciphering procedure to generate enciphered identification data; and comparing said deciphered validation data and said enciphered identification data for correspondence to generate said transaction approval state.

6. A method for operating a computing system selectively to authorize, reject, and conditionally authorize transaction requests, the computing system including a data base of validation data elements associated with data base access data, enciphering means for operating on data according to an enciphering procedure, and communication means for communicating data with respect to a transaction terminal, the method comprising the steps of:

receiving on said communication means a transaction request message including data base access data and enciphered identification data;

retrieving from said data base the validation data element corresponding to said data base access data;

deciphering said identification data in accordance with said enciphering procedure to generate deciphered identification data;

comparing said deciphered identification data and said validation data element to generate a conditional approval state upon failure of correspondence;

enciphering said validation data element in accordance with said enciphering procedure to generate enciphered validation data;

responsive to said conditional approval state, communicating onto said communication means a conditional transaction approval message including said enciphered validation data.

7. The method of claim 6 further comprising the preliminary step of enciphering identification data to generate a validation data element for storing in said data base.

8. A method for operating a computing system selectively to approve and reject transaction requests, the computing system including a host data processing unit and a transaction terminal; wherein the host data processing unit includes a data base of validation data elements associated with data base access data, first enciphering means for operating on data according to an enciphering procedure, and first communication port means for communicating data with respect to the transaction terminal; and wherein the transaction terminal includes second enciphering means for operating on data according to said enciphering procedure, means for receiving identification data from a terminal operator, and second communication port means for communicating data with respect to the host data processing unit; the method comprising the steps of:

generating in said transaction terminal a transaction request message including first enciphered identification data and data base access data;

communicating said transaction request message to said host data processing unit;

responsive to communication to said transaction request message, retrieving from said data base the validation data element corresponding to said data base access data;

operating said first deciphering means to decipher said first enciphered identification data to generate deciphered identification data;

comparing said deciphered identification data and said validation data element to generate a conditional approval state upon failure of correspondence;

enciphering said validation data element in accordance with said enciphering procedure to generate enciphered validation data;

responsive to said conditional approval state, communicating to said transaction terminal a conditional transaction approval message including said enciphered validation data;

responsive to communication of a conditional transaction approval message from said host data processing unit, obtaining further indentification data from said terminal operator;

comparing said validation data and said further identification data for correspondence according to said enciphering procedure to selectively generate a transaction approval or reject state.

9. The method of claim 8 wherein said enciphering procedure includes first and second enciphering procedures, and wherein the step of comparing said validation data and said further identification data further includes the step of:

deciphering said validation data in accordance with said first and second enciphering procedures to generate deciphered validation data for comparison with said further identification data.

10. The method of claim 8 wherein said enciphering procedure includes first and second enciphering procedures, and wherein the step of comparing said validation data and said further identification data further includes the steps of deciphering said validation data in accordance with said first enciphering procedure to generate deciphered validation data;

enciphering said further identification data in accordance with said second enciphering procedure to generate second enciphered identification data; and comparing said deciphered validation data and said second enciphered identification data to selectively generate said transaction approval or reject state.

* * * * *